July 27, 1937.  F. W. SPERR, JR  2,088,003
RECOVERY OF HYDROCYANIC ACID
Filed March 9, 1935  2 Sheets-Sheet 1
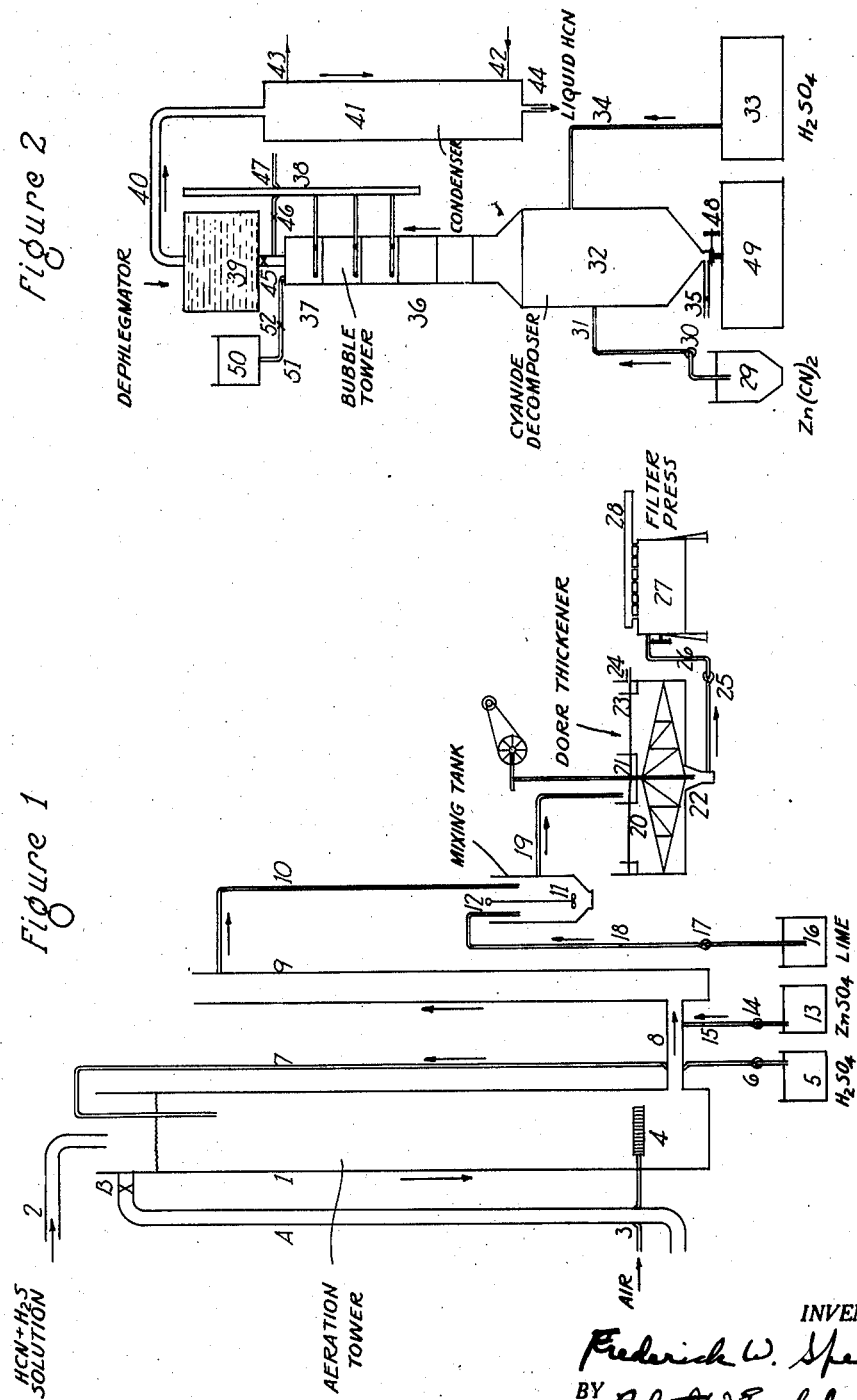

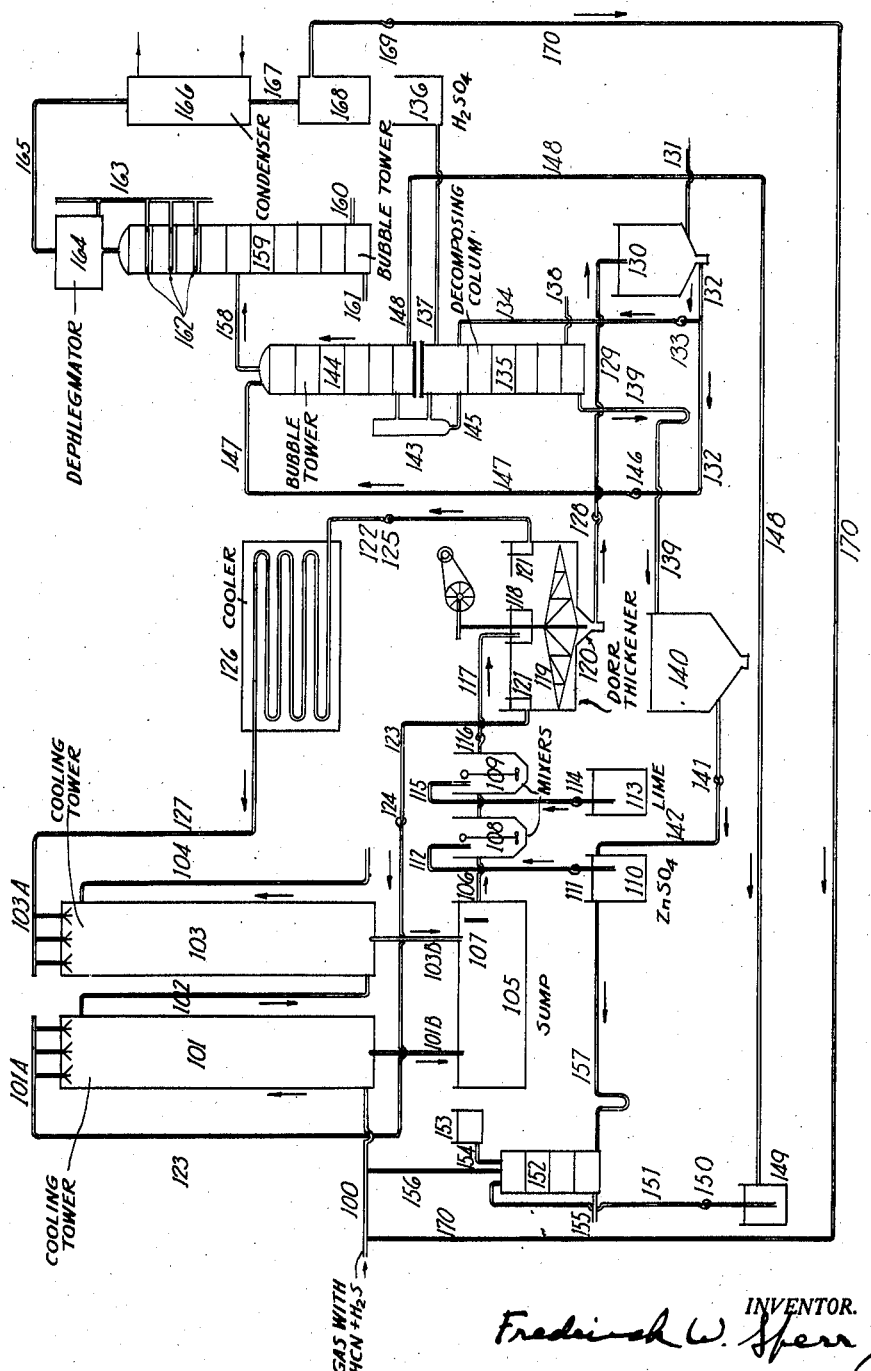

Patented July 27, 1937

2,088,003

UNITED STATES PATENT OFFICE 2,088,003

RECOVERY OF HYDROCYANIC ACID

Frederick W. Sperr, Jr., Vineland, N. J., assignor to Röhm & Haas Company, Philadelphia, Pa.

Application March 9, 1935, Serial No. 10,156

16 Claims. (Cl. 23—151)

This invention relates to a process for the recovery of hydrocyanic acid from coke oven gases and more particularly to the process for the recovery of hydrocyanic acid from gases which also contain hydrogen sulfide.

In my copending application Serial No. 734,420, filed July 9, 1934, I have described the process for separating hydrocyanic acid from coke oven or fuel gases which also contain hydrogen sulfide, which depends on the differences in solubilities of hydrocyanic acid and hydrogen sulfide in water. In this process practically all of the hydrogen sulfide is removed from a dilute solution of the two gases by aeration and the hydrocyanic acid subsequently evolved and absorbed.

The present method depends on the fact that zinc cyanide is insoluble in water and by treating a dilute solution of hydrocyanic acid containing some hydrogen sulfide with a soluble zinc salt under proper conditions, all of the hydrocyanic acid may be precipitated and by subsequent treatment of this precipitate with an acid, the hydrocyanic acid and residual traces of hydrogen sulfide are set free and may be separated by fractional rectification in a suitable apparatus.

This process may be carried out in two steps, the first of which comprises the preparation and separation of zinc cyanide in the form of a filter cake, and the second the treatment of this filter cake in a separate apparatus for the production of substantially pure hydrocyanic acid. It is also possible to carry out the process continuously and this is the preferred form, particularly in cases where it is possible to regenerate the hydrocyanic acid in the same plant in which the zinc cyanide is formed.

Most by-product coke plants use the so-called direct process for the manufacture of ammonium sulfate in which the gas after the removal of the water, is passed through surfuric acid. The ammonium sulfate which is formed crystallizes out and is recovered by centrifuging. The gas, which contains both hydrocyanic acid and hydrogen sulfide, leaving the sulfuric acid solution is usually at a temperature of about 50 to 60° C. This gas requires cooling which is generally accomplished by direct scrubbing with water. Practically all of the hydrocyanic acid produced in the coking process eventualy passes unchanged through the sulfuric acid and if sufficient cooling water at a sufficiently low temperature is employed in a scrubber of adequate capacity, substantially all of the hydrocyanic acid in the gas is washed out, thus forming a very dilute solution which has hitherto been allowed to go to waste.

My invention consists in a process for recovering cyanide compounds including hydrocyanic acid in concentrated form from this very dilute solution, and also includes means for removing hydrogen sulfide and other impurities, so as to avoid contamination of the cyanide compounds which may then be recovered in a substantialy pure state. The solution coming from the scrubber may contain from 0.10 to 0.25 gram of hydrocyanic acid per litre and hydrogen sulfide equivalent to from 10 to 50% of the weight of the hydrocyanic acid present. Most of this hydrogen sulfide may be separated from the hydrocyanic acid by aeration as shown in my copending application referred to above.

The present process may be carried out in the apparatus shown in the drawings in which Figure 1 shows an apparatus for the separation of hydrocyanic acid as zinc cyanide;

Figure 2, an apparatus for regenerating and collecting substantially pure hydrocyanic acid from the zinc cyanide formed in the apparatus shown in Figure 1;

Figure 3 shows an apparatus for the continuous separation of zinc cyanide and regeneration and collection of substantially pure hydrocyanic acid.

Referring specifically to the drawings, the dilute solution from the scrubbers is led to the top of a cylindrical aeration tower 1 through pipe 2. Compressed air is blown into the tower at a point near the bottom through pipe 3 and distributor 4 which distributor may consist simply of a row of perforated pipes.

To provide for removal of any naphthalene scum that may accumulate at the top of the tower, pipe A with valve B may be installed. Valve B may be opened from time to time to allow water and scum to run off either to waste or to the sump which is usually provided for skimming naphthalene from gas cooler water.

I have found it advantageous to provide means of controlling the hydrogen ion concentration of the water at the top of the tower, such control facilitating the maximum separation of hydrogen sulfide with a minimum air requirement and minimum loss of hydrocyanic acid. Best conditions are obtained by adding sufficient acid to maintain a pH of from 4.0 to 6.0. Sulphuric acid may be used for this purpose and may be pumped from tank 5 through pump 6 and pipe 7 to the top of the tower 1, or else to any point in the water pipe 2. If the acid is introduced at the top of the tower, it is desirable to introduce it at a point below the level at which naphthalene accumulates.

Acid-proof material should be used for the construction or lining of all apparatus from the point of addition of acid to the point of addition of lime which will be discussed below.

Instead of using sulfuric acid for the pH control of the water in the aeration tower, I may use a solution of zinc sulfate containing excess acid obtained in the decomposition of zinc cyanide for the production of hydrocyanic acid as described below. This practice will result in substantial economy of sulfuric acid; but it is always desirable that the zinc sulphate solution contain sufficient excess acid to prevent precipitation of zinc sulfide.

Under proper conditions, 80 to 95% of the hydrogen sulfide will be removed from the cooler water in the aeration tower, while the loss of hydrocyanic acid should be less than 10%.

To eliminate the last traces of hydrogen sulfide, a little chlorine or other oxidizing gas may be added to the air in pipe 3. I may, however, permit the small amount of hydrogen sulfide to remain and be precipitated as zinc sulfide, which will be decomposed as described below.

The water passes out of the bottom of the tower through pipe 8 into vertical pipe 9 having an overflow 10, the height of which is adjusted to maintain a suitable constant level in the tower 1. The water flows from pipe 10 into mixing tank 11 equipped with agitating means 12.

A solution of zinc sulfate is pumped from tank 13 by pump 14 through pipe 15 into pipe 8 and becomes thoroughly mixed with the water as it flows upward through pipe 9. Milk of lime contained in tank 16 is pumped by pump 17 through pipe 18 into the mixing tank 11. Thorough mixing of the lime with the water at this point facilitates the efficient precipitation of zinc cyanide and its efficient removal in the supsequent apparatus.

In practice I have found that best conditions for the efficient precipitation of zinc cyanide are obtained when the zinc sulfate solution is added at such a rate as to supply from 20 to 40% more zinc sulfate than is theoretically necessary to combine with the hydrocyanic acid present. The milk of lime is then added at such a rate as to maintain a pH of 6.9 to 7.6 in the water leaving mixing tank 11. Fair results may be obtained within a pH range of 6.8 to 8.2, but outside of this range the amount of hydrocyanic acid lost in the final effluent rapidly increases. The zinc salt and lime or other alkali can be added in any desired order.

Pumps 6, 14, and 17 may have automatic controls to regulate the rate of chemical additions proportionately to the rate of flow of cooler water. It is better, however, to maintain a constant rate of pumping the cooler water and a constant rate of operating pump 14 handling the zinc sulfate solution, while making pumps 6 and 17 automatically responsive to variations of hydrogen ion concentration in the water.

The water flowing out of mixing tank 11 contains a precipitate consisting principally of zinc cyanide, with some zinc hydroxide, zinc carbonate, and calcium carbonate. A small amount of zinc sulfide may also be present. This water flows through pipe 19 into a Dorr thickener 20. Any other efficient type of thickener may be used, the purpose being to obtain the precipitated material in the form of a fairly concentrated slurry and producing a clear effluent which may be run to waste or used for gas cooling or other purposes. The water with precipitate flows into feed well 21 from which it overflows into the thickener tank. The solids drop to the bottom of the thickener and are collected in the well 22 by the action of the sweeps, while the clear effluent overflows into the annular trough 23 and thence to outlet pipe 24.

My complete invention contemplates the utilization of the zinc cyanide for the manufacture of hydrocyanic acid, with the production of a zinc sulfate solution which is returned to the water-treating process. If the hydrocyanic acid is to be manufactured in or near the by-product coke plant producing the cooler water, the slurry from the Dorr thickener may be used without further treatment. Such utilization is described below in connection with a modification of my invention which eliminates the step of aerating the cooler water, and need not be further discussed at this point. If the hydrocyanic acid is to be made in a separate plant and at some distance from the point of treating the cooler water, it will be desirable to filter the slurry in order to avoid transportation of excessive amounts of water. In the apparatus shown in Figure 1 the slurry is pumped by pump 25 through pipe 26 into filter 27, the filtrate passing out through pipe 28. The filter cake is then transported to the hydrocyanic acid plant.

The essential features of the hydrocyanic acid plant are shown in Figure 2. Weighed amounts of the zinc cyanide filter cake are placed in tank 29 to which is added sufficient water to make a thick slurry which is pumped by pump 30 through pipe 31 to the decomposer 32. Into this sulfuric acid is pumped or blown from tank 33 through pipe 34, the amount of acid required being usually about twice the equivalent of the amount of zinc in the contents of the decomposer. Steam is blown into the decomposer through pipe 35 and indirect steam heating may also be employed.

The hydrocyanic acid and water vapor pass upward through the column 36 which may consist of several bubbling sections, the top sections preferably being equipped with cooling coils 37 supplied with water from pipe 38. Much of the water vapor is caught in this column and returned to the decomposer. The concentrated hydrocyanic acid gas then passes through a dephlegmator 39 containing cooling coils, also supplied with water from pipe 38. This dephlegmator removes most of the remaining water. The hydrocyanic acid gas then passes through pipe 40 into condenser 41 containing cooling coils or sections cooled with refrigerated brine which enters at 42 and leaves at 43. Liquid hydrocyanic acid passes out through pipe 44 and is collected in suitable containers.

After completion of decomposition of the zinc cyanide and expulsion of the hydrocyanic acid so far as practicable, valve 45 is closed and valve 46 opened and the decomposer and column are thoroughly purged with steam which passes out through pipe 47 carrying any residual hydrocyanic acid. This may be scrubbed out in a small water-scrubber and precipitated with lime and zinc sulphate or recovered in some other manner.

The acid zinc sulphate liquor, free from hydrocyanic acid, is removed from the decomposer by opening valve 48 and allowing the liquor to run into tank 49. As the zinc cyanide filter cake usually contains calcium carbonate and possibly calcium sulphate, the acid zinc sulphate liquor may contain a substantial amount of insoluble calcium sulphate. It is usualy desirable to remove this by sedimentation or filtration before transferring the zinc sulfate liquor to tank 13 in Figure 1, where it is used in the recovery of additional zinc cyanide.

The gas cooler water usually contains naphthalene, some of which may contaminate the zinc cyanide precipitate. It is desirable to remove such naphthalene from the filter cake so as to avoid contamination of the hydrocyanic acid and possible stoppage of parts of the decomposing apparatus. For this purpose the filter cake may be thoroughly steamed before removing it from the filter 27, or else it may be steamed in tank 29.

Unless the aeration treatment of the gas cooler water for removal of hydrogen sulfide is supplemented by treatment with oxidizing agents or other reactive substances added to the water simultaneously with, or immediately following, aeration, the zinc cyanide precipitate will contain small amounts of zinc sulfide which will be converted into hydrogen sulfide in the decomposer. For many purposes this will do no harm; but where it is desired to completely eliminate all traces of hydrogen sulfide, I have found that this may be effectively accomplished by adding an oxidizing agent, such as a permanganate or bichromate, to the zinc cyanide slurry in decomposer 32 before or simultaneously with the addition of the sulfuric acid. Alternatively the solution of the oxidizing agent may be added to the top section or one of the upper sections of column 36, the addition being made from tank 50 through pipe 51 and valve 52. Best results are obtained by using twice as much bichromate or permanganate as is theoretically required to oxidize the hydrogen sulfide evolved; but as very small amounts of zinc sulfide are present, the cost of this excess of oxidizing agent is inconsiderable.

Instead of removing hydrogen sulfide from the gas cooler water by aeration or other means preliminary to precipitation of zinc cyanide, I may permit such hydrogen sulfide to remain and be precipitated as zinc sulfide simultaneously with the precipitation of the zinc cyanide. In the subsequent treatment of the precipitate with sulfuric acid, the zinc sulfide will be decomposed, forming hydrogen sulfide and zinc sulfate; and the hydrogen sulfide will be evolved along with the hydrocyanic acid unless oxidizing agents are added as described above. Instead of using oxidizing agents, however, I may employ one of the following alternative methods for separating the hydrogen sulfide from the hydrocyanic acid evolved by such sulfuric acid treatment.

First, I may scrub the evolved gases with a portion of the zinc cyanide slurry obtained in the precipitation process, whereby the hydrogen sulfide will react with the zinc cyanide, forming zinc sulfide and liberating hydrocyanic acid.

Second, I may separate hydrogen sulfide gas from the liquid hydrocyanic acid produced in the condensing apparatus, taking advantage of the fact that the temperature of condensation of hydrocyanic acid gas is much higher than that of hydrogen sulfide.

Both of these methods are best adapted to the situation where it is desired to manufacture the hydrocyanic acid at or near the point of production of the gas cooler water, in which situation it will generally be unnecessary to filter the zinc cyanide precipitate. An arrangement of apparatus for carrying out the first method is shown in Figure 3.

The gas, after the removal of the ammonia, is led through pipe 100 to the bottom of the cooling tower 101 and then in succession through pipe 102, cooling tower 103, and pipe 104, and thence to the usual apparatus for removal of benzols and/or hydrogen sulfide. In the cooling towers the gas is scrubbed with cold water from the sprays 101A and 103A, and the outlet water carrying naphthalene in suspension and hydrocyanic acid with some hydrogen sulfide in solution, flows out through pipes 101B and 103B into a sump 105 having outlet pipe 106. Most of the naphthalene rises to the surface in the form of a scum which is removed from time to time and is prevented by the baffle 107 from reaching the outlet pipe.

For adding zinc sulfate and lime, mixing tanks 108 and 109 equipped with means for agitation are provided. The gas cooler water flows continuously through these while a solution of zinc sulfate is continuously pumped from tank 110 through pump 111 and pipe 112 into mixer 108, and a suspension of milk of lime is pumped continuously from tank 113, pump 114 and pipe 115 into mixer 109. Best conditions for efficient precipitation are obtained when the zinc sulfate solution is added at such a rate as to supply from 20 to 40 per cent more zinc sulfate than is theoretically necessary to combine with all of the hydrocyanic acid and hydrogen sulfide present, while milk of lime is added at such a rate as to maintain a pH of 6.9 to 7.6 in the water leaving mixer 109. Pump 111 may conveniently be regulated in proportion to the rate of flow of gas cooler water, while the operation of pump 114 is made automatically responsive to variations of hydrogen ion concentration.

The water from mixer 109 is pumped by pump 116 through pipe 117 into feed well 118 of Dorr thickener 119. The solids, consisting chiefly of zinc cyanide and zinc sulfide with some zinc hydroxide, zinc carbonate and calcium carbonate, drop to the bottom of the thickener and are collected in the well 120 by the action of the sweeps, while the clear effluent overflows into the annular trough 121 and thence to outlet pipes 122 and 123.

This effluent may be allowed to go to waste; but in many cases, advantage will be gained by recirculating it over the gas coolers. One important advantage consists in the saving of some zinc cyanide and other zinc compounds that might otherwise go to waste. The solubility of such compounds is very small, but their amount is appreciable in a large volume of water.

In recirculating the effluent over the coolers, part may be pumped directly through pipe 123 and pump 124 to the sprays 101A over the tower 101 into which the gas first enters. If the temperature of the effluent is much over 15 degrees C., it is desirable to cool the portion used on the second scrubber 103 in order to obtain substantially complete removal of the hydrocyanic acid from the gas. For this purpose the said portion is pumped by pump 125 through pipe 122 and through cooling coils 126 immersed in refrigerated water or other cooling medium. This cooled portion of the effluent then passes through pipe 127 to sprays 103A at the top of the scrubber 103.

The precipitated solids accumulating in the form of a slurry in the well 120 are removed by pump 128 through pipe 129 to the tank 130 which is equipped with means for introducing steam from pipe 131. The purpose of the steam is to remove any entrained naphthalene, the hot slurry, free from naphthalene, passing out through pipe 132. The greater part of this slurry is pumped by pump 133 through pipe 134 to the top section of a decomposing column 135 into which sulfuric acid from feed tank 136 is fed through pipe 137. The rate of acid feed is maintained so as to supply approximately twice as much sulfuric acid as is theoretically required for combination with the total zinc compounds passing through the decomposing column. Direct steam is introduced into the bottom section of this column through pipe 138 so as to remove substantially all of the hydrocyanic acid from the liquid, which then flows out through pipe 139. This liquid is principally a solution of zinc sulfate containing excess sulfuric acid. It may, however, contain some calcium sulfate and a little undecomposed zinc sulfide. These solids may be removed by filtration or by settling in the storage tank 140. From this storage tank the acid zinc sulfate solution is transferred by pump 141 through pipe 142 to tank 110.

In the decomposing column 135 hydrocyanic acid and hydrogen sulfide are evolved and pass, together with steam, through pipe 143 into the bottom section of an upper column 144. Pipe 143 is adapted to catch any foam or spray from the decomposing column, the trapped liquid being returned through pipe 145. The column 144 has the usual bubbling trays or sections and serves as a washer to remove hydrogen sulfide. For this purpose part of the zinc cyanide slurry is pumped from pipe 132 by pump 146 and passes up through pipe 147 to the top section of column 144. The hydrogen sulfide reacts with the zinc cyanide, liberating hydrocyanic acid and forming zinc sulfide. As there is practically no reverse reaction between hydrocyanic acid and zinc sulfide, the vapors passing out of the top section of 144 contain substantially no hydrogen sulfide. The rate of feed of zinc cyanide slurry is maintained so that the liquid passing out of the bottom section through pipe 148 contains principally zinc sulfide in suspension with very little zinc cyanide. Any zinc hydroxide or zinc carbonate present in the slurry entering the top of 144 will also react with hydrogen sulfide and serve the same purpose in its removal as the zinc cyanide. As the amount of hydrogen sulfide in the vapors from the decomposing column 135 is always small in proportion to the hydrocyanic acid (10% by weight of the hydrocyanic acid, for example), the proportion of the zinc cyanide slurry necessary for its removal is not large.

The suspension of zinc sulfide flowing out through pipe 148 may be transferred to tank 149 and pumped by pump 150 through pipe 151 to the top of a small decomposing column 152. Sulfuric acid from feed tank 153 is introduced through pipe 154 into the top of this column, while steam is blown into the bottom section through pipe 155. The sulfuric acid reacts with the zinc sulfide, forming zinc sulfate and liberating hydrogen sulfide which passes out with the steam through pipe 156. This hydrogen sulfide may be disposed of in various ways. It may, for example, be conducted into the gas main 100 whereby any hydrocyanic acid also present will pass into the coolers 101 and 103 and be recovered. In a continuously operating system, an equilibrium will soon be established between the hydrogen sulfide absorbed by the water in the coolers and that returned from the zinc sulfide decomposer 152, beyond which point no increase of zinc sulfide formation will occur.

The zinc sulfate solution flowing out of the bottom of the decomposing column 152 is transferred through pipe 157 to tank 110.

The hydrocyanic acid gas and steam from the top section of the washing column 144 pass out through pipe 158 into the middle section of column 159. Steam is blown into the bottom section of this column through pipe 160 so as to remove substantially all of the hydrocyanic acid from the condensate. This condensate flows out through pipe 161, and if small amounts of hydrocyanic acid are present it may be returned to the precipitating system; for example, it may be pumped to tank 108.

The top sections of column 159 are equipped with cooling coils 162 supplied with water from pipe 163. The hydrocyanic acid gas, still containing a little water vapor, passes from the top of this column through dephlegmator 164 containing cooling coils or sections also supplied with cold water from pipe 163. The substantially dry hydrocyanic acid passes out through pipe 165 through condenser 166, where it is cooled with refrigerated brine and liquefied. The liquid hydrocyanic acid flowing out through pipe 167 may be stored as desired.

Reference has been made to an alternative method wherein the hydrogen sulfide is separated from the liquid hydrocyanic acid. In the execution of this method, the washing column 144 and its accessories are omitted and the gases from the decomposing column 135 are caused to pass directly through pipe 158 into the middle of column 159. The gases leaving the dephlegmator through pipe 165 will consist of hydrocyanic acid and hydrogen sulfide, and the hydrocyanic acid will be liquefied in condenser 166 while the hydrogen sulfide will remain in gaseous form. The liquid hydrocyanic acid may be accumulated in closed container 168 while the hydrogen sulfide is removed by vacuum pump 169 through pipe 170. This hydrogen sulfide may be returned through pipe 170 to the gas main 100 so that any hydrocyanic acid which it may carry will be recovered.

As stated in the foregoing descriptions, I employ lime as the alkaline precipitating agent in conjunction with zinc sulfate for the production of zinc cyanide, the accurate control of the hydrogen ion concentration being essential to the success of the process. Other alkaline agents may be substituted for lime provided they do not form zinc compounds which do not react or react too slowly with hydrocyanic acid. For example, I have successfully used sodium hydroxide, magnesia and ammonia. The substitution of ammonia for lime may be economical in many by-product coke plants.

The essential feature of my invention is that it recovers the hydrocyanic acid from a highly dilute aqueous solution in the form of a simple cyanide of low solubility in water, which may readily be decomposed by sulfuric acid, regenerating the precipitating agent and producing hydrocyanic acid in concentrated form. In the process described, zinc was used for the precipitation of the hydrocyanic acid. However, any other metal which forms a simple insoluble cyanide under the conditions given may be used in place of the zinc. I have found that zinc is the most convenient to use, but nickel, cadmium or any other metal conforming to the above requirements may be used to replace the zinc.

Since hydrocyanic acid is a very weak acid, any of a large number of water soluble organic or inorganic acids can be used to regenerate hydrocyanic acid from the insoluble cyanide. For example, hydrochloric acid may be used and sulfur dioxide may also be employed to decompose the zinc cyanide. The latter is particularly advantageous because of its well known influence in retarding or preventing the decomposition of hydrocyanic acid.

This invention is not confined to the specific form of apparatus shown because other units of equal function may be substituted for any of the units in this apparatus. The operating conditions such as temperature, pressure, rate of flow and relative proportion of reagents, may also be varied within the scope of the following claims.

I claim:—

1. The process of recovering hydrocyanic acid from gases containing it which comprises scrubbing the gases with water to form a dilute aqueous solution of the hydrocyanic acid, treating it with a soluble zinc salt at a pH of 6.8 to 8.2 to precipitate zinc cyanide, separating the zinc cyanide from the water and treating it with sulfuric acid to regenerate the hydrocyanic acid.

2. The process of recovering hydrocyanic acid from gases containing it which comprises scrubbing the gases with water to form a dilute aqueous solution of the hydrocyanic acid, treating it with a soluble zinc salt at a pH of 6.8 to 8.2 to precipitate zinc cyanide, separating the zinc cyanide from the water, treating it with sulfuric acid to regenerate the hydrocyanic acid, and condensing the hydrocyanic acid.

3. The process of recovering hydrocyanic acid from gases containing it which comprises scrubbing the gases with water to form a dilute aqueous solution of the hydrocyanic acid, treating it with a soluble zinc salt and sufficient alkali to adjust the pH to 6.8 to 8.2 in order to precipitate zinc cyanide, separating the zinc cyanide from the water and treating it with sulfuric acid to regenerate the hydrocyanic acid.

4. The process of recovering hydrocyanic acid from gases containing it which comprises scrubbing the gases with water to form a dilute aqueous solution of the hydrocyanic acid, treating it with a soluble zinc salt and sufficient lime to adjust the pH to 6.8 to 8.2 in order to precipitate zinc cyanide, separating the zinc cyanide from the water and treating it with sulfuric acid to regenerate the hydrocyanic acid.

5. The process of recovering hydrocyanic acid from gases containing it which comprises scrubbing the gases with water to form a dilute aqueous solution of the hydrocyanic acid, treating it with a soluble zinc salt and sufficient ammonia to adjust the pH to 6.8 to 8.2 in order to precipitate zinc cyanide, separating the zinc cyanide from the water and treating it with sulfuric acid to regenerate the hydrocyanic acid.

6. The process of recovering hydrocyanic acid from gases containing it which comprises scrubbing the gases with water to form a dilute aqueous solution of the hydrocyanic acid, treating it with zinc sulfate and adding milk of lime to adjust the pH to 6.8 to 8.2, thus precipitating the zinc cyanide, separating the zinc cyanide from the water, treating it with sulfuric acid to regenerate the hydrocyanic acid, and condensing the hydrocyanic acid.

7. The process of recovering hydrocyanic acid from gases containing it which comprises scrubbing the gases with water to form a dilute aqueous solution of the hydrocyanic acid, treating it with a soluble zinc salt at a pH of 6.8 to 8.2 to precipitate zinc cyanide, separating the zinc cyanide from the water and treatng it with sulfuric acid to regenerate the hydrocyanic acid, returning the zinc sulfate solution thus formed to the precipitation step.

8. The process of recovering hydrocyanic acid from gases which also contain hydrogen sulfide which comprises scrubbing the gases with water to form a dilute aqueous solution of hydrocyanic acid and hydrogen sulfide, treating it with a zinc salt at a pH of 6.8 to 8.2 to precipitate zinc cyanide and zinc sulfide, separating said precipitate from the water, treating it with an acid to regenerate hydrocyanic acid and hydrogen sulfide, and liquifying the hydrocyanic acid to separate it from the hydrogen sulfide.

9. The process of recovering hydrocyanic acid from gases which also contain hydrogen sulfide comprising forming a dilute solution of both gases by scrubbing, adjusting the pH of said solution to 4.0 to 6.0, aerating the solution to remove substantially all the hydrogen sulfide, adding a soluble zinc salt and lime in any desired order to precipitate zinc cyanide at a pH of 6.8 to 8.2 separating the precipitate from the water and regenerating the hydrocyanic acid by means of sulfuric acid.

10. The process of recovering hydrocyanic acid from gases which also contain hydrogen sulfide comprising forming a dilute solution of both gases by scrubbing, adjusting the pH of said solution to 4.0 to 6.0, aerating the solution to remove substantially all the hydrogen sulfide, adding a soluble zinc salt and lime in any desired order to precipitate zinc cyanide and zinc sulfide at a pH of 6.8 to 8.2, separating the precipitate from the water and regenerating the hydrocyanic acid by means of sulfuric acid, and liquefying the hydrocyanic acid to separate it from any residual hydrogen sulfide.

11. The process of recovering hydrocyanic acid from gases which also contain hydrogen sulfide comprising forming a dilute solution of both gases by scrubbing, adjusting the pH of said solution to 4.0 to 6.0, aerating the solution to remove substantially all the hydrogen sulfide, adding a soluble zinc salt and lime in any desired order to precipitate zinc cyanide and zinc sulfide at a pH of 6.8 to 8.2, separating the precipitate from the water, regenerating the hydrocyanic acid by means of sulfuric acid, and scrubbing the regenerated hydrocyanic acid with a slurry of zinc cyanide to remove residual hydrogen sulfide.

12. The process of recovering hydrocyanic acid from gases which also contain hydrogen sulfide comprising forming a dilute solution of both gases by scrubbing, adjusting the pH of said solution to 4.0 to 6.0, aerating the solution to remove substantially all the hydrogen sulfide, adding a soluble zinc salt and lime in any desired order to precipitate zinc cyanide and zinc sulfide at a pH of 6.8 to 8.2, separating the precipitate from the water and regenerating the hydrocyanic acid by means of sulfuric acid, scrubbing the regenerated hydrocyanic acid with a slurry of zinc cyanide to remove residual hydrogen sulfide and condensing the hydrocyanic acid.

13. The process of recovering hydrocyanic acid from gases which also contain hydrogen sulfide comprising forming a dilute solution of both gases by scrubbing, adjusting the pH of said solution to 4.0 to 6.0, aerating the solution to remove substantially all the hydrogen sulfide, adding a soluble zinc salt and lime in any desired order to precipitate zinc cyanide and zinc sulfide at a pH of 6.8 to 8.2, separating the precipitate from the water and regenerating the hydrocyanic acid by means of sulfuric acid, liquefying the hydrocyanic acid to separate it from any residual hydrogen sulfide, and returning the zinc sulfate solution thus formed to the precipitating step.

14. The process of recovering hydrocyanic acid from gases which also contain hydrogen sulfide comprising forming a dilute solution of both gases by scrubbing, adjusting the pH of said solution to 4.0 to 6.0, aerating the solution to remove substantially all the hydrogen sulfide, adding a soluble zinc salt and lime successively to precipitate zinc cyanide at a pH of 6.8 to 8.2, separating the precipitate and returning the liquid to the scrubbing step.

15. In the process of producing relatively pure hydrocyanic acid from zinc cyanide containing zinc sulfide, the step comprising treating the zinc cyanide with sulfuric acid and an oxidizing agent.

16. A process for recovering hydrocyanic acid from gases containing it which comprises scrubbing the gases with water to form a dilute, aqueous solution of the hydrocyanic acid, treating it with a soluble zinc salt to precipitate zinc cyanide from an approximately neutral solution, separating the zinc cyanide thus precipitated from the water and treating it with an acid which will regenerate the hydrocyanic acid.

FREDERICK W. SPERR, Jr.